United States Patent
Morita et al.

(10) Patent No.: US 7,303,838 B2
(45) Date of Patent: Dec. 4, 2007

(54) NEGATIVE ELECTRODE ACTIVE MATERIAL FOR NONAQUEOUS ELECTROLYTE SECONDARY BATTERY AND NONAQUEOUS ELECTROLYTE SECONDARY BATTERY

(75) Inventors: Tomokazu Morita, Funabashi (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 508 days.

(21) Appl. No.: 10/667,863

(22) Filed: Sep. 23, 2003

(65) Prior Publication Data

US 2004/0115535 A1   Jun. 17, 2004

(30) Foreign Application Priority Data

Sep. 26, 2002   (JP)   ............................. 2002-280303

(51) Int. Cl.
  *H01M 8/00*   (2006.01)
(52) U.S. Cl. ..................... 429/231.8; 252/502
(58) Field of Classification Search .......... 429/218.12, 429/231.8, 232, 218.1; 252/502; 427/58
  See application file for complete search history.

(56) References Cited

U.S. PATENT DOCUMENTS

| | | | |
|---|---|---|---|
| 6,383,686 B1 | 5/2002 | Umeno et al. | |
| 6,495,291 B1 | 12/2002 | Kohno et al. | |
| 2003/0215711 A1* | 11/2003 | Aramata et al. | 429/218.1 |
| 2006/0068287 A1* | 3/2006 | Morita et al. | 429/223 |

FOREIGN PATENT DOCUMENTS

JP   2000-215887   8/2000

OTHER PUBLICATIONS

Weibing Xing, et al. "Pyrolyzed Polysiloxanes for Use as Anode Materials in Lithium-Ion Batteries," J. Electrochem. Soc., vol. 144, No. 7, Jul. 1997, p. 2410-2416.

* cited by examiner

*Primary Examiner*—Patrick Joseph Ryan
*Assistant Examiner*—Monique Wills
(74) *Attorney, Agent, or Firm*—Oblon, Spivak, McClelland, Maier & Neustadt, P.C.

(57) ABSTRACT

The present invention provides a negative electrode active material for nonaqueous electrolyte secondary battery, including carbonaceous particles and a Si phase dispersed in the carbonaceous particles, wherein a half width of a diffraction peak of (220) plane in powder X-ray diffraction is 1.5° or more and 8° or less, and an average size of the Si phase is less than 100 nm.

13 Claims, 9 Drawing Sheets

FIG. 5  20nm
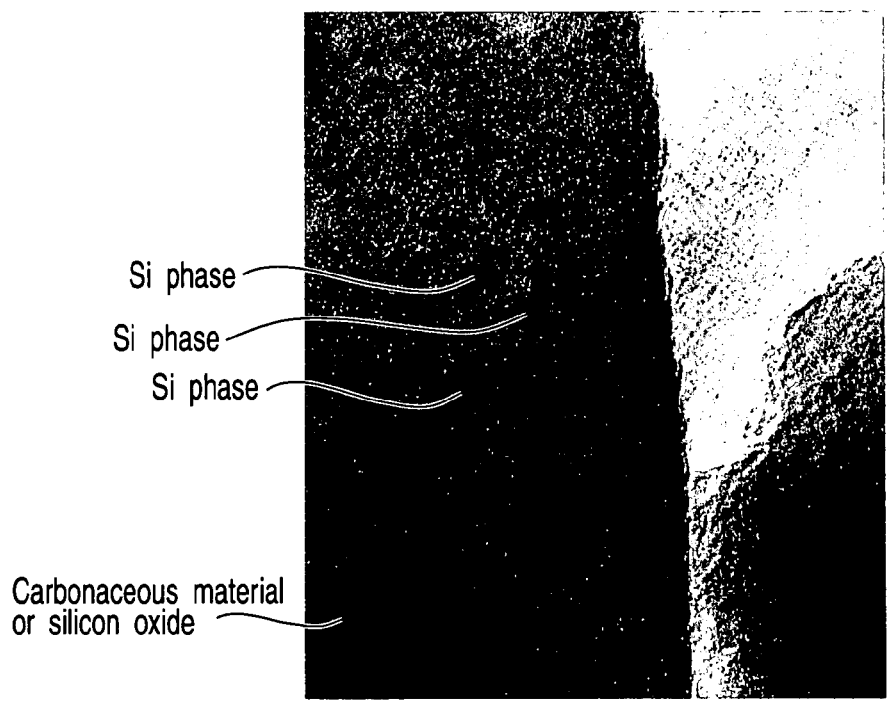
FIG. 6  20nm (c) Electron beam diffraction pattern
Si microcrystal (311)  (220)  (111)

NEGATIVE ELECTRODE ACTIVE MATERIAL FOR NONAQUEOUS ELECTROLYTE SECONDARY BATTERY AND NONAQUEOUS ELECTROLYTE SECONDARY BATTERY

CROSS-REFERENCE TO RELATED APPLICATIONS

This application is based upon and claims the benefit of priority from the prior Japanese Patent Application No. 2002-280303, filed Sep. 26, 2002, the entire contents of which are incorporated herein by reference.

BACKGROUND OF THE INVENTION

1. Field of the Invention

The present invention relates to a negative electrode active material for nonaqueous electrolyte secondary battery and a nonaqueous electrolyte secondary battery.

2. Description of the Related Art

Owing to the rapid progress in downsizing technology of electronic appliances, recently, various portable electronic appliances are developed and distributed widely. Downsizing is also required in the batteries used as power sources for these portable electronic appliances, and nonaqueous electrolyte secondary batteries having a high energy density are attracting much attention.

A nonaqueous electrolyte secondary battery using metal lithium as negative electrode active material has a very high energy density, but the battery life is short because dendritic crystals called dendrites deposit on the negative electrode at the time of charging. Besides, in the secondary battery, dendrites grow and reach up to the positive electrode to cause internal short-circuit, thereby leading to safety problems. Accordingly, as a negative electrode active material replacing the lithium metal, it has been proposed to use carbon materials, in particular, graphitized material capable of absorbing and desorbing lithium. However, the capacity of graphitized material is small as compared with that of lithium metal or lithium alloy, and large current characteristics are low. It has been also attempted to use substances of larger lithium absorption capacity and high density, such as elements which are alloyed with lithium, for example, silicon and tin, or an amorphous chalcogen compound.

Above all, silicon can absorb lithium up to a ratio of 4.4 atoms of lithium per 1 atom of silicon, and the negative electrode capacity per weight is about 10 times that of graphitized material. However, since silicon is large in change of volume due to intercalation and deintercalation of lithium in the charging and discharging cycles, particles of the active material are finely pulverized, and there were problems in cycle life.

Jpn. Pat. Appln. KOKAI Publication No. 2000-215887 discloses a negative electrode material for lithium secondary battery, comprising a silicon particle nucleus and a carbon layer for covering the surface of the silicon particle nucleus.

According to the publication, the average particle size of silicon particle nucleus is 0.1 to 50 µm. However, if the average particle size of particle nucleus is 0.1 µm or more, it is hard to prevent pulverization and cracking of the active material in the charging and discharging cycle.

The publication does not specify the half width of any diffraction peak at the (220) plane of silicon, determined by the powder X-ray diffraction of negative electrode material. However, in the publication, as silicon particle nucleus, reagent first class silicon powder by Wako Pure Chemical Industries, Ltd. is used. It is known that this powder is crystalline silicon powder. From the description about the material and in view of FIG. 1 of the publication, it can be inferred that the diffraction peak at the (220) plane of silicon has a half width of less than 0.1°.

FIG. 1 of the publication shows the XRD profile of the negative electrode material used in Example 2. FIG. 1 does not represent the entire image of the peak at the (220) plane of silicon. An accurate half width cannot be determined from FIG. 1. Assuming that the maximum peak intensity shown on the axis of ordinates in FIG. 1 is the peak intensity of (220) plane, the present inventors measured the half width. The result was a value smaller than 0.1°.

In the negative electrode active material mentioned in the publication, it is difficult to realize a battery of higher capacity and higher cycle characteristic.

BRIEF SUMMARY OF THE INVENTION

It is hence an object of the invention to provide a negative electrode active material for nonaqueous electrode secondary battery capable of achieving high capacity and high cycle characteristic, and a nonaqueous electrolyte secondary battery comprising the negative electrode active material.

According to a first aspect of the invention, there is provided a nonaqueous electrolyte secondary battery comprising:

a positive electrode;

a negative electrode containing a negative electrode active material including carbonaceous particles and a Si phase dispersed in the carbonaceous particles; and a nonaqueous electrolyte;

wherein the negative electrode active material is 1.5° or more and 8° or less in a half width of a diffraction peak derived from (220) plane of silicon in powder X-ray diffraction, and an average size of the Si phase is less than 100 nm.

According to a second aspect of the invention, there is provided a negative electrode active material for nonaqueous electrolyte secondary battery, including carbonaceous particles and a Si phase dispersed in the carbonaceous particles, wherein a half width of a diffraction peak of (220) plane in powder X-ray diffraction is 1.5° or more and 8° or less, and an average size of the Si phase is less than 100 nm.

BRIEF DESCRIPTION OF THE SEVERAL VIEWS OF THE DRAWING

FIG. 5 is a transmission electron microscopic picture magnified by 800,000 times of the negative electrode active material in Example 7.

FIG. 6 shows the transmission electron microscopic picture in FIG. 5 with a caption added thereto.

DETAILED DESCRIPTION OF THE INVENTION

Figure 1:
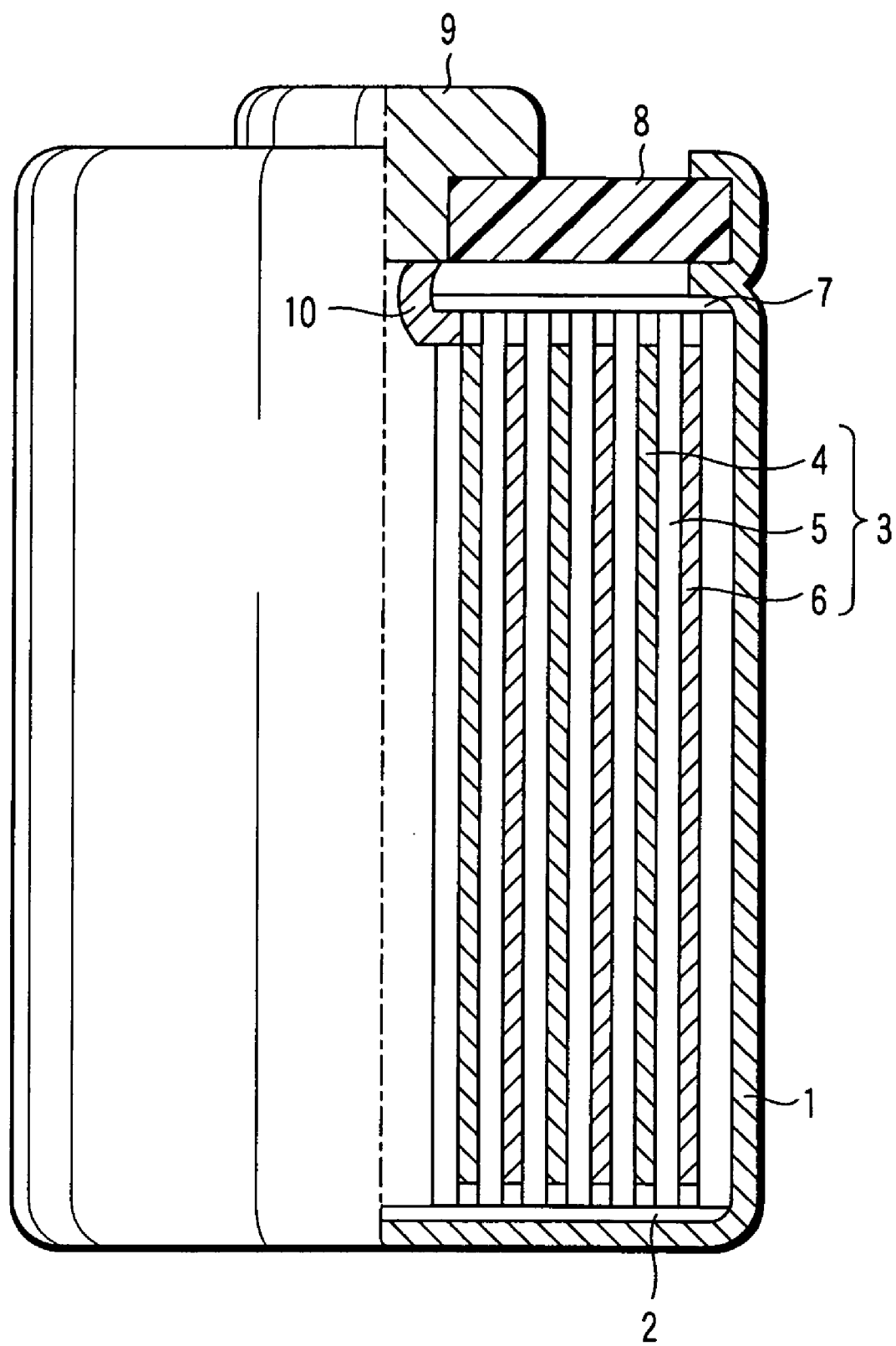
FIG. 1 is a partial sectional view showing a cylindrical nonaqueous electrolyte secondary battery as an example of a nonaqueous electrolyte secondary battery according to the invention.

A negative electrode active material for nonaqueous electrolyte secondary battery of the invention will be described below.

The negative electrode active material for nonaqueous electrolyte secondary battery according to the invention comprises carbonaceous particles and a Si phase dispersed in the carbonaceous particles, and the half width of the diffraction peak of (220) plane in powder X-ray diffraction is 1.5° or more and 8° or less, and the average size of the Si phase is less than 100 nm. Carbonaceous particles are mother phase for the Si phase. Carbonaceous particles in which a Si phase is dispersed are not a mere mixture of silicon and carbonaceous material, but are a composite material containing Si and C.

As a result of intensive repeated experiments, the inventors discovered that the cycle characteristic can be improved only slightly if attempted to improve by dispersing Si in the carbonaceous material of the negative electrode active material. Concerning its cause, a causative relation is discovered between the size of dispersing crystals of Si and bonding strength with the substrate around Si, and it is found that the higher capacity and enhanced cycle characteristic can be achieved by dispersing microcrystalline Si in the carbonaceous material in a state being included or held in $SiO_2$ capable of bonding the microcrystalline Si firmly, and thereby the invention is completed.

A preferred aspect of the negative electrode active material of the invention includes three phases, that is, a Si phase, a $SiO_2$ phase, and a carbonaceous material phase, and they are compounded in a small size. Since the Si phase can intercalate and deintercalate a large amount of lithium, the capacity of the negative electrode active material can be notably increased. Expansion and shrinkage by intercalation and deintercalation of a large amount of lithium in the Si phase can be lessened by dispersing the Si phase in the other two phases to prevent pulverization of carbonaceous particles, and the carbonaceous material phase can maintain a high conductivity as the negative electrode active material. On the other hand, the $SiO_2$ phase is strongly bond with the Si phase, and functions as a buffer for preventing pulverization of Si phase, so that it contributes greatly to maintenance of the particle structure.

The ratio of the Si phase, $SiO_2$ phase, and carbonaceous material phase is preferably in a range of $0.2 \leq (Si/C) \leq 2$ as the molar ratio of Si and carbon. As the quantitative relation between the Si phase and the $SiO_2$ phase, the molar ratio is preferred to be in a range of $0.6 \leq (Si/SiO_2) \leq 1.5$ because a large capacity and a favorable cycle characteristic can be obtained as the negative electrode active material.

Preferably, the Si phase is dispersed in the carbonaceous particles in a smaller size in order to relax the stress because expansion and shrinkage are large when intercalating and deintercalating the lithium. Specifically, it is preferred to be dispersed in a cluster size of several units of nm to 300 nm or less at most. The average size of the Si phase is more preferably less than 100 nm. This is because volume changes due to expansion and shrinkage of the Si phase increase as the Si phase size increases, so that, when the average size of the Si phase is 100 nm or more, the negative electrode active material gradually decays along with the progress of charging and discharging, and the charging and discharging cycle of the secondary battery becomes shorter.

The lower limit of the average size of the Si phase is preferred to be 1 nm. The reason is as follows. If the average size of the Si phase is smaller than 1 nm, the rate of Si atoms occupying the crystal surface area increases in the Si phase. Since the Si atoms on the outermost layer of the Si phase form bonds with other different atoms such as oxygen, and do not contribute to intercalation of lithium, if the size of the Si phase is smaller than 1 nm, it is possible that the lithium intercalation amount may decrease significantly.

A more preferred range of the average size of the Si phase is 2 nm or more and 50 nm or less.

Carbonaceous particles may further contain a silicon oxide phase. The silicon oxide phase can absorb and lessen the expansion and shrinkage due to intercalation and deintercalation of lithium by the Si phase. Preferably, the silicon oxide phase should contain at least one compound of $SiO_2$ and SiO.

The silicon oxide phase such as $SiO_2$ phase may be either amorphous phase or crystalline phase. The silicon oxide phase such as $SiO_2$ phase is preferred to be bonded with the Si phase, and dispersed uniformly among carbonaceous particles in a state including or holding the Si phase. Specifically, when at least part of the Si phase is enclosed by silicon oxide phase, expansion and shrinkage of the Si phase can be absorbed by the silicon oxide phase, and the charging and discharging cycle life of the secondary battery can be further extended. Meanwhile, part of the silicon oxide phase may be an isolated phase which does not contact with the Si phase.

Examples of the carbonaceous material include graphite, hard carbon, soft carbon, amorphous carbon, and acetylene black. One or two or more types of the carbonaceous material may be used. Preferably, a mixture of hard carbon or soft carbon with graphite should be used as the carbonaceous material. Graphite is preferred from the viewpoint of enhancement of conductivity of the active material. On the other hand, hard carbon or soft carbon can coat the Si phase, and is hence large in effect of lessening the expansion and shrinkage. The carbonaceous material is preferred to be in a form of including the Si phase or the silicon oxide phase such as $SiO_2$ phase. Specifically, when the Si phase and silicon oxide phase are surrounded with the carbonaceous material phase, expansion and shrinkage of the Si phase can be sufficiently lessened by absorption of the carbonaceous material phase and silicon oxide phase, so that the charging and discharging cycle of the secondary battery can be further enhanced.

The shape of the carbonaceous particles is not particularly specified, and may include, for example, spherical, fibrous, scaly and indefinite shapes.

The average particle size of carbonaceous particles is preferred to be 5 μm or more and 100 μm or less. The specific surface area of carbonaceous particles is preferred to be 0.5 m²/g or more and 15 m²/g or less. The particle size and specific surface area of active material particles have an effect on the reaction speed of intercalation and deintercalation of lithium, and hence have a large influence on the negative electrode characteristics. By defining the average particle size and specific surface area of carbonaceous particles in the specified range, the secondary battery can exhibit the characteristics stably.

The average particle size of carbonaceous particles can be measured, for example, by laser diffraction particle size analyzer.

The negative electrode active material is 1.5° or more to 8° or less in the half width of the diffraction peak derived from (220) plane of silicon in powder X-ray diffraction. This is due to the reason explained below. The half width of the diffraction peak of Si (220) plane becomes smaller as the crystal grains of the Si phase grow, and the active material particles are likely to be cracked by expansion and shrinkage due to intercalation and deintercalation of lithium as the crystal grains of the Si phase become larger. If the half width is less than 1.5°, expansion and shrinkage due to intercalation and deintercalation of lithium of the Si phase increase. Therefore, pulverization of carbonaceous particles is promoted, and the charging and discharging cycle life of the secondary battery becomes shorter. On the other hand, if the half width exceeds 8°, the Si phase is high in amorphous property, and chemical stability of the Si phase is lower, so that decomposition reaction of nonaqueous electrolyte is likely to occur, and hence the discharge capacity or charging and discharging cycle life of the secondary battery is lowered. A more preferred range of the half width is 2° or more and 6° or less.

Carbonaceous particles are preferred to satisfy the following formula (1):

$$0.2 \leq (X_1/X_2) \leq 2 \quad (1)$$

where the $X_1$ is the molar number of a silicon atom in the carbonaceous particles, and the $X_2$ is the molar number of a carbon atom in the carbonaceous particles. When the silicon oxide phase is contained in the carbonaceous particles, meanwhile, the molar number of silicon atom $X_1$ is the total molar number of silicon atom composing the Si phase and silicon atom composing the silicon oxide phase.

The reason for defining $(X_1/X_2)$ in this range is explained. If $(X_1/X_2)$ is less than 0.2, high capacity may not be obtained in the secondary battery. On the other hand, if $(X_1/X_2)$ exceeds 2, expansion and shrinkage of the Si phase may not be absorbed sufficiently. Therefore, distortion due to expansion and shrinkage is increased, pulverization of carbonaceous particles is promoted, and a long charging and discharging cycle life may not be obtained in the secondary battery.

Carbonaceous particles are preferred to satisfy the following formula (2Y:

$$0.6 \leq (X_1/X_3) \leq 1.5 \quad (2)$$

where the $X_1$ is the molar number of a silicon atom of the Si phase, and the $X_3$ is the molar number of a silicon oxide molecule of the silicon oxide phase.

The reason for defining $(X_1/X_3)$ in this range is explained. Since the silicon oxide does not intercalate or deintercalate lithium, if $(X_1/X_3)$ is less than 0.6, high capacity may not be obtained in the secondary battery. On the other hand, if $(X_1/X_3)$ exceeds 2, expansion and shrinkage of Si phase may not be absorbed sufficiently. Therefore, distortion due to expansion and shrinkage is increased, pulverization of carbonaceous particles is promoted, and a long charging and discharging cycle life may not be obtained in the secondary battery.

First and second methods of manufacturing a negative electrode active material for nonaqueous electrolyte secondary battery of the invention are explained below.

The first method of manufacturing a negative electrode active material for nonaqueous electrolyte secondary battery of the invention includes baking a mixture containing at least one organic material of a carbon material and a carbon material precursor, and $SiO_X$ ($0.8 \leq X \leq 1.5$), in an inert atmosphere at temperature of 850° C. or more and less than 1400° C.

The second method of manufacturing a negative electrode active material for nonaqueous electrolyte secondary battery of the invention includes treating a mixture containing at least one organic material of a carbon material and a carbon material precursor, and $SiO_X$ ($0.8 \leq X \leq 1.5$), by dynamic compounding process in an inert atmosphere.

According to the first and second manufacturing methods, the negative electrode active material of the invention can be obtained.

To begin with, the first manufacturing method is explained.

As the Si material, it is preferred to use $SiO_X$ ($0.8 \leq X \leq 1.5$). In particular, it is preferred to use SiO (x≈1) for keeping the quantitative relation of Si phase and $SiO_2$ phase at a favorable ratio. The form is powder and the average particle size is 1 μm or more and 50 μm or less. In a baking process explained later, $SiO_X$ is separated into a fine Si phase and $SiO_2$ phase, and in order to assure a conductive path between fine separated Si phases, the average particle size of $SiO_X$ powder is preferred to be as small as possible. This is because, if the average particle size is large, the Si phase is thickly coated with the $SiO_2$ phase of insulator in the central parts of particles, and the reaction of intercalation and deintercalation of lithium in the active material is impeded. Therefore, the average particle size of $SiO_X$ powder is preferred to be 50 μm or less. However, since the surface of $SiO_X$ particles contacting with the atmosphere is likely to be oxidized to become $SiO_2$, when the average particle size is extremely small, the surface area increases, so that the particle surface becomes $SiO_2$, and the composition thereof becomes unstable. Accordingly, the average particle size is preferred to be 1 μm or more.

As raw materials of the carbonaceous material, in addition to carbon materials which is carbonized or graphitized such as graphite, acetylene black, carbon black, and hard carbon, carbon material precursors such as pitch, resin and polymer, which become the carbon material by being heated in an inert atmosphere can be used. As materials of the carbonaceous material, combining a carbon material having high electric conductivity such as graphite and acetylene black, and a carbon material precursor which is not carbonized yet such as polymer and pitch is preferred. When the carbon material precursor such as pitch and polymer is fused or polymerized with $SiO_X$ powder in a stage before baking, $SiO_X$ particles can be dispersed in the carbon material precursor. In the manufacturing method of the invention, the carbonizing and baking temperature is relatively low, that is, 800° C. or more and less than 1400° C., the degree of graphitization of carbonized pitch or polymer is not so high.

Therefore, in order to enhance the conductivity of the active material, it is preferred to add graphite, acetylene black, or the like.

When pitch is used as the carbon material precursor, $SiO_X$ and the carbon materials such as graphite are added in fused pitch, and they are mixed, cooled, solidified, and then ground, and after the surface thereof is oxidized and made infusible, the resultant material is subject to carbonization baking. When polymer is used as the carbon material precursor, $SiO_X$ and the carbon material such as graphite are dispersed in monomer, and polymerized and solidified, and the resultant material is subject to carbonization baking.

The carbonization baking process is executed in an inert atmosphere of Ar gas or the like. In carbonization baking process, polymer or pitch is carbonized, and $SiO_X$ is separated into a Si phase and a $SiO_2$ phase by disproportionation reaction. In case of x=1, the reaction is expressed in the following formula (A):

$$2SiO \rightarrow Si + SiO_2 \quad (A)$$

This disproportionation reaction progresses at a higher temperature than 800° C. $SiO_X$ is separated into a fine Si phase and $SiO_2$ phase due to disproportionation reaction. As the reaction temperature becomes higher, the crystal size of the Si phase becomes larger, and the half width of peak of Si (220) plane becomes smaller. The baking temperature at which a preferred half width is obtained is in a range of 850° C. to less than 1400° C. Further, the Si produced by disproportionation reaction reacts with carbon at a temperature higher than 1400° C., and is transformed into SiC. Since SiC is completely inert to intercalation of lithium, the capacity of the active material drops when SiC is formed. Therefore, the temperature of carbonization baking is preferred to be 850° C. or more and less than 1400° C., and more preferably 850° C. or more and 1300° C. or less, and still more preferably 900° C. or more and 1100° C. or less. The baking time is preferred to be somewhere between about 1 hour and 12 hours.

The negative electrode active material of the invention is obtained by this synthesizing method. The product after carbonization baking is provided as an active material after adjustment of the particle size, specific surface area and the like by means of various mills, a pulverizing machine, a grinder, or the like.

The second method of manufacturing a negative electrode active material of the invention is described below.

Dynamic compounding process is executed by means of turbo mill, ball mill, mechanofusion, disk mill, etc.

As a Si material, it is preferred to use $SiO_X$ ($0.8 \leq X \leq 1.5$). It is particularly preferred to use SiO ($X \approx 1$) from the viewpoint of obtaining a favorable ratio of quantitative relation between the Si phase and the $SiO_2$ phase. The form of $SiO_X$ may be bulk, but fine powder is preferred for shortening the processing time, and the average particle size is preferred to be 0.5 μm or more and 100 μm or less. This is owing to the reason explained below. If the average particle size exceeds 100 μm, the Si phase is thickly coated with the $SiO_2$ phase of an insulator in the central area of particles, and the reaction of intercalation and deintercalation of lithium in the active material may be impeded. On the other hand, if the average particle size is less than 0.5 μm, the surface area is large, so that the particle surface becomes $SiO_2$, and the composition thereof may be unstable.

As an organic material, at least one may be selected from a carbon material and a carbon material precursor. Examples of the carbon material include graphite and coke. On the other hand, examples of the carbon material precursor include low temperature baking coal and pitch. In particular, since materials, such as pitch, which are fused by heating are fused in the mill process and disturb the progress of compounding, adding nonfusible materials such as coke and graphite is preferred.

The operating condition of compounding process varies according to the device, but it is preferred to operate in a condition allowing a sufficient progress of grinding and compounding. However, if the output is raised excessively or too much time is taken in the compounding process, Si and C react with each other to produce SiC which is inert to Li intercalation reaction. Accordingly, the processing condition is preferably determined properly so as to promote grinding and compound sufficiently, but not to induce SiC production.

The baking process may be executed in the same condition as explained in the first manufacturing method.

The nonaqueous electrolyte secondary battery using the negative electrode active material of the invention is described below.

1) Positive Electrode

The positive electrode has a structure in which a positive electrode active material layer containing an active material is carried on one side or both sides of a positive electrode current collector.

The thickness of one side of the positive electrode active material layer is preferred to be in a range of 10 μm to 150 μm from the viewpoint of large current discharging characteristic and cycle life of the battery. Therefore, when carried on both sides of the positive electrode current collector, the total thickness of the positive electrode active material layer is preferred to be in a range of 20 μm to 300 μm. A more preferred range of the thickness of one side is 30 μm to 120 μm. Within this range, the large current discharging characteristic and the cycle life can be enhanced.

The positive electrode active material layer may also contain a conductive agent aside from the positive electrode active material.

The positive electrode active material layer may further contain a binding agent for binding the positive electrode materials.

The positive electrode active material may be selected from various oxides, and in order to obtain a high voltage, it is preferred to use, for example, manganese dioxide, lithium manganese composite oxide, lithium-containing nickel cobalt oxide (for example, $LiCoO_2$), lithium-containing nickel cobalt oxide (for example, $LiNi_{0.8}Co_{0.2}O_2$), and lithium manganese composite oxide (for example, $LiMn_2O_4$, and $LiMnO_2$).

Examples of the conductive agent include acetylene black, carbon black, and graphite.

Specific examples of the binding agent include polytetrafluoroethylene (PTFE), polyvinylidene fluoride (PVdF), ethylene-propylene-diene copolymer (EPDM), and styrene-butadiene rubber (SBR).

The blending rate of the positive electrode active material, conductive agent, and binding agent is in a range of 80 to 95 wt. % of the positive electrode active material, 3 to 20 wt. % of the conductive agent, and 2 to 7 wt. % of the binding agent, so that favorable large current discharging characteristic and cycle life can be obtained.

As the current collector, a conductive substrate of a porous structure or non-porous conductive substrate may be used. The thickness of the current collector is preferred to be 5 to 20 μm. In this range, the electrode strength and reduction of weight are balanced favorably.

2) Negative Electrode

The negative electrode has a structure in which a negative electrode active material layer containing a negative electrode active material is carried on one side or both sides of a negative electrode current collector.

The thickness of the negative electrode active material layer is preferred to be in a range of 10 µm to 150 µm. Therefore, when carried on both sides of the negative electrode current collector, the total thickness of the negative electrode active material layer is preferred to be in a range of 20 µm to 300 µm. A more preferred range of the thickness of one side is 30 µm to 100 µm. Within this range, the large current discharging characteristic and the cycle life can be enhanced.

The negative electrode active material layer may also contain a binding agent for binding the negative electrode materials. Specific examples of the binding agent include polytetrafluoroethylene (PTFE), polyvinylidene fluoride (PVdF), ethylene-propylene-diene copolymer (EPDM), and styrene-butadiene rubber (SBR).

The negative electrode active material layer may further contain a conductive agent. Examples of the conductive agent include acetylene black, carbon black, and graphite.

As the current collector, a conductive substrate of porous structure or non-porous conductive substrate may be used. The conductive substrates may be made from, for example, copper, stainless steel or nickel. The thickness of the current collector is preferred to be 5 to 20 µm. In this range, the electrode strength and reduction of weight are balanced favorably.

3) Electrolyte

Examples of the electrolyte include nonaqueous electrolysis solution, electrolyte-impregnated polymer electrolyte, polymer electrolyte, and inorganic solid electrolyte.

The nonaqueous electrolysis solution is prepared by dissolving an electrolyte in a nonaqueous solvent, and it is held among gaps in the electrode group in a liquid form.

The nonaqueous solvent is preferred to be a mixed solvent of propylene carbonate (PC) or ethylene carbonate (EC) with a nonaqueous solvent having lower viscosity than PC or EC (hereinafter called second solvent) As the second solvent, for example, chain carbon is preferred, and other preferred examples include dimethyl carbonate (DMC), methyl ethyl carbonate (MEC), diethyl carbonate (DEC), ethyl propionate, methyl propionate, γ-butyrolactone (BL), acetonitrile (AN), ethyl acetate (EA), toluene, xylene, and methyl acetate (MA). These second solvents may be used either alone or as a mixture of two or more solvents. In particular, the second solvent is preferred to have the number of donors of 16.5 or less.

The viscosity of the second solvent is preferred to be 2.8 cmp or less at 25° C. The content of ethylene carbonate or propylene carbonate in the mixed solvent is preferred to be in a range of 10% to 80% as the ratio by volume. A more preferred range of content of ethylene carbonate or propylene carbonate is 20% to 75% as the ratio by volume.

Examples of the electrolyte contained in the nonaqueous electrolysis solution include lithium salts such as lithium perchlorate ($LiClO_4$), lithium phosphate hexafluoride ($LiPF_6$), lithium borate tetrafluoride ($LiBF_4$), lithium arsenate hexafluoride ($LiAsF_6$), lithium trifluoromethasulfonate ($LiCF_3SO_3$), and bistrifluoromethyl sulfonyl imide lithium [$LiN(CF_3SO_2)_2$]. In particular, it is preferred to use $LiPF_6$ or $LiBF_4$.

The amount of electrolyte dissolved in the nonaqueous solvent is preferred to be 0.5 to 2 mol/L.

4) Separator

A separator can be used when using nonaqueous electrolysis solution or electrolyte-impregnated polymer electrolyte. The separator is a porous separator. Materials for the separator include, for example, a porous film containing polyethylene, polypropylene, or polyvinylidene fluoride (PVdF), and a nonwoven cloth made of synthetic resin. Above all, a porous film containing polyethylene or polypropylene or both of them is preferred from the viewpoint of enhancing the safety of the secondary battery.

The thickness of the separator is preferred to be 30 µm or less. If the thickness exceeds 30 µm, the distance between the positive and negative electrodes is too long, and the internal resistance may increase. The lower limit of the thickness is preferred to be 5 µm. If the thickness is less than 5 µm, the strength of the separator is extremely lowered and an internal short-circuit is likely to occur. The upper limit of the thickness is more preferably 25 µm, and the lower limit is more preferably 10 µm.

The thermal shrinkage of the separator when it is kept for 1 hour at 120° C. is preferred to be 20% or less. If the thermal shrinkage exceeds 20%, it is highly possible that short-circuit may occur by heating. More preferably, the thermal shrinkage should be 15% or less.

The porosity of the separator is preferred to be in a range of 30 to 70%. The reason is as follows. If the porosity is less than 30%, it may be difficult to obtain a high electrolyte holding property in the separator. On the other hand, if the porosity exceeds 70%, sufficient separator strength may not be obtained. A more preferable range of the porosity is 35 to 70%.

The air permeability of the separator is preferred to be 500 sec/100 $cm^3$ or less. If the air permeability exceeds 500 sec/100 $cm^3$, it may be hard to obtain a high lithium ion mobility in the separator. The lower limit of the air permeability is 30 sec/100 $cm^3$. If the air permeability is less than 30 sec/100 $cm^3$, a sufficient separator strength may not be obtained.

The upper limit of the air permeability is more preferably 300 sec/100 $cm^3$, and the lower limit is more preferably 50 sec/100 $cm^3$.

As an example of the nonaqueous electrolyte secondary battery of the invention, a cylindrical nonaqueous electrolyte secondary battery is specifically described below while referring to FIG. 1.

For example, a stainless steel container 1 of cylindrical shape with a bottom includes an insulator 2 provided at the bottom thereof. An electrode group 3 is contained in the container 1. The electrode group 3 includes a positive electrode 4, a separator 5, a negative electrode 6, and a separator 5, which are laminated into a band, and wound spirally such that the separator 5 comes to the outer side.

The container 1 is filled with an electrolysis solution. An insulating paper 7 having a central opening, is provided above the electrode group 3 in the container 1. An insulating sealing plate 8 is provided in the upper opening of the container 1, and by crimping the upper opening to the inner side, the sealing plate 8 is fixed to the container 1. A positive electrode terminal 9 is fitted to the center of the insulating sealing plate 8. One end of a positive electrode lead 10 is connected to the positive electrode 4, and the other end is connected to the positive electrode terminal 9. The negative electrode 6 is connected to the container 1, as a negative electrode terminal, by way of a negative electrode lead (not shown).

FIG. 1 shows an example of application into the cylindrical nonaqueous electrolyte secondary battery, but the invention may be applied in the nonaqueous electrolyte secondary battery of any form. For example, it can be applied in a prismatic nonaqueous electrolyte secondary battery, a thin type nonaqueous electrolyte secondary battery, a coin-shaped nonaqueous electrolyte secondary battery, and the like. The electrode group contained in the container of the battery is not limited to the spiral shape, but, for example, the positive electrode, separator and negative electrode may be laminated in this sequence in plural layers.

In FIG. 1, the example is an application in the nonaqueous electrolyte secondary battery using a case made of a metal can, but the invention can be similarly applied in a nonaqueous electrolyte secondary battery using a case made of a film material. As the film material, it is preferred to use a laminated film including a thermoplastic resin and an aluminum layer.

Specific examples of the invention are given below, and the effects thereof are explained. It must be noted, however, that the invention is not limited to these examples.

EXAMPLES 1 to 5 and COMPARATIVE EXAMPLES 1 and 2

As the $SiO_X$ material, amorphous SiO powder having the average particle size of 30 μm was prepared. As the carbon material, graphite having the average particle size of 6 μm was prepared. As the carbon material precursor, furfuryl alcohol was prepared. The blending ratio by weight was SiO: graphite: furfuryl alcohol=3:0.5:5. To furfuryl alcohol, water was added by 1/10 weight, graphite and SiO were added and stirred. Then, dilute hydrochloric acid was added by 1/10 weight of furfuryl alcohol, and stirred, and the mixture was let stand to be polymerized and solidified.

The obtained solid material was baked in Ar gas at baking temperature and for baking time shown in Table 1, cooled to room temperature, and then ground by a grinder, so that a negative electrode active material was obtained by sifting by 30 μm in particle size.

TABLE 1

|  | Baking temperature | Baking time |
| --- | --- | --- |
| Example 1 | 800° C. | 3 hours |
| Example 2 | 1000° C. | 3 hours |
| Example 3 | 1100° C. | 3 hours |
| Example 4 | 1200° C. | 3 hours |
| Example 5 | 1300° C. | 3 hours |
| Comparative example 1 | 700° C. | 3 hours |
| Comparative example 2 | 1400° C. | 3 hours |

COMPARATIVE EXAMPLE 3

Using Si powder having the average particle size of 0.5 μm instead of SiO powder, the Si powder, graphite and furfuryl alcohol were mixed at a ratio by weight of Si: graphite: furfuryl alcohol=1:0.5:5, and a negative electrode active material was obtained in the same manner as in Example 1 except that the baking temperature was 1000° C.

The obtained negative electrode active materials of Examples 1 to 5 and Comparative examples 1 to 3 were tested by powder X-ray diffraction and transmission electron microscope observation in the following conditions, and the charging and discharging characteristics were evaluated in the following method, and obtained results are shown in Table 2.

(Powder X-ray Diffraction)

For the obtained powder samples, powder X-ray diffraction was carried out, and the half width of the peak of Si (220) plane was measured. It was measured in the following condition by using an X-ray diffraction measuring apparatus of Mac Science Co. (model M18XHF22).

Counter cathode: Cu
Tube voltage: 50 kV
Tube current: 300 mA
Scanning speed: 1° (2θ)/min
Time constant: 1 sec
Receiving slit: 0.15 mm
Divergent slit: 0.5°
Scattering slit: 0.5°

Figure 2:
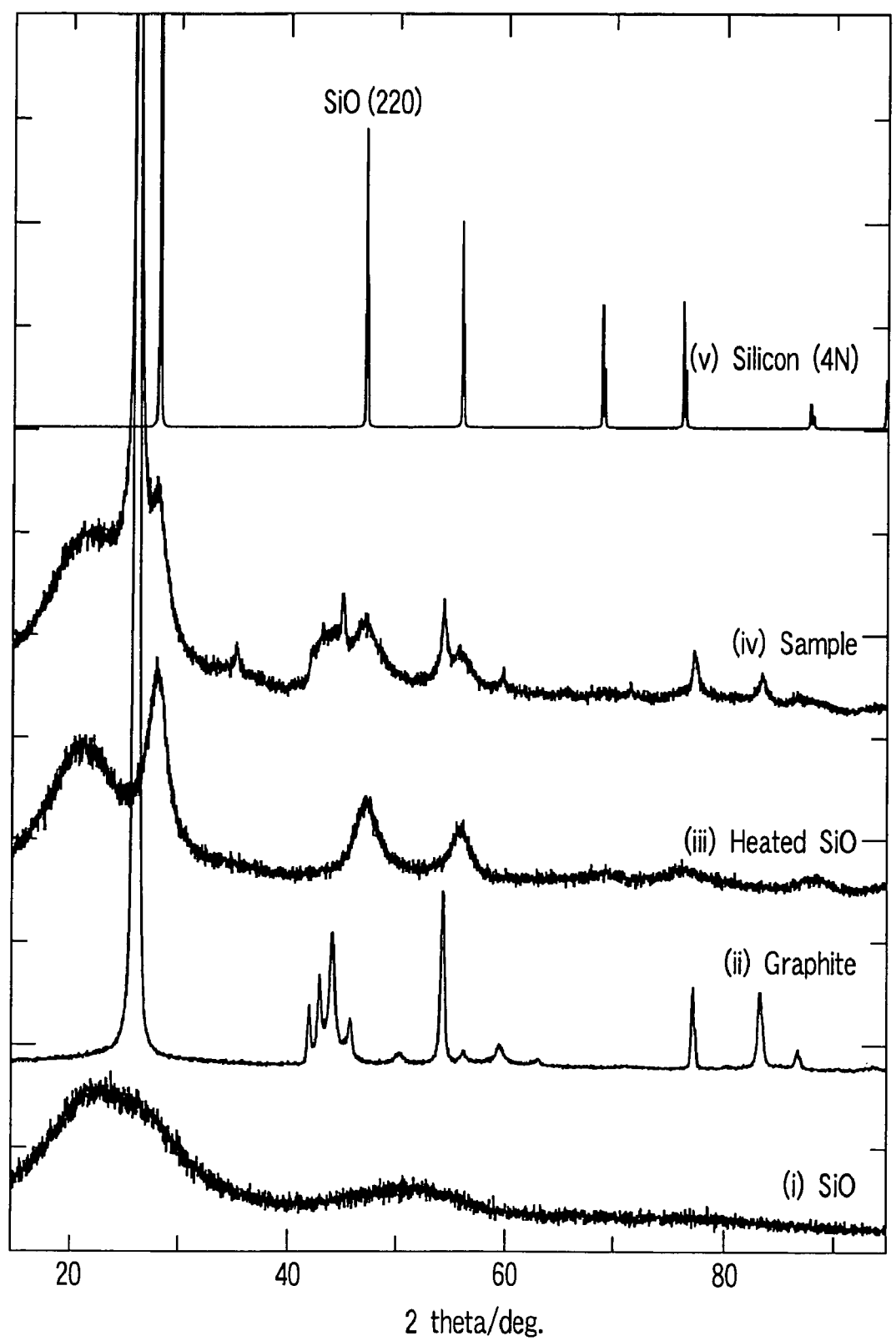
FIG. 2 is a characteristic diagram for comparing a powder X-ray diffraction pattern of a negative electrode active material and a powder X-ray diffraction pattern of a raw material in Example 7.

FIG. 2 shows an X-ray diffraction (XRD) pattern of the negative electrode active material of Example 7 and an XRD pattern of a raw material of the negative electrode active material. FIG. 2 shows XRD patterns of, sequentially from the bottom:

(i) material SiO,
(ii) material graphite,
(iii) SiO baked for 3 hours at 1000° C. in argon gas flow,
(iv) XRD pattern of negative electrode active material (sample) of Example 7, and
(v) XRD pattern of 4N silicon.

Figure 3:
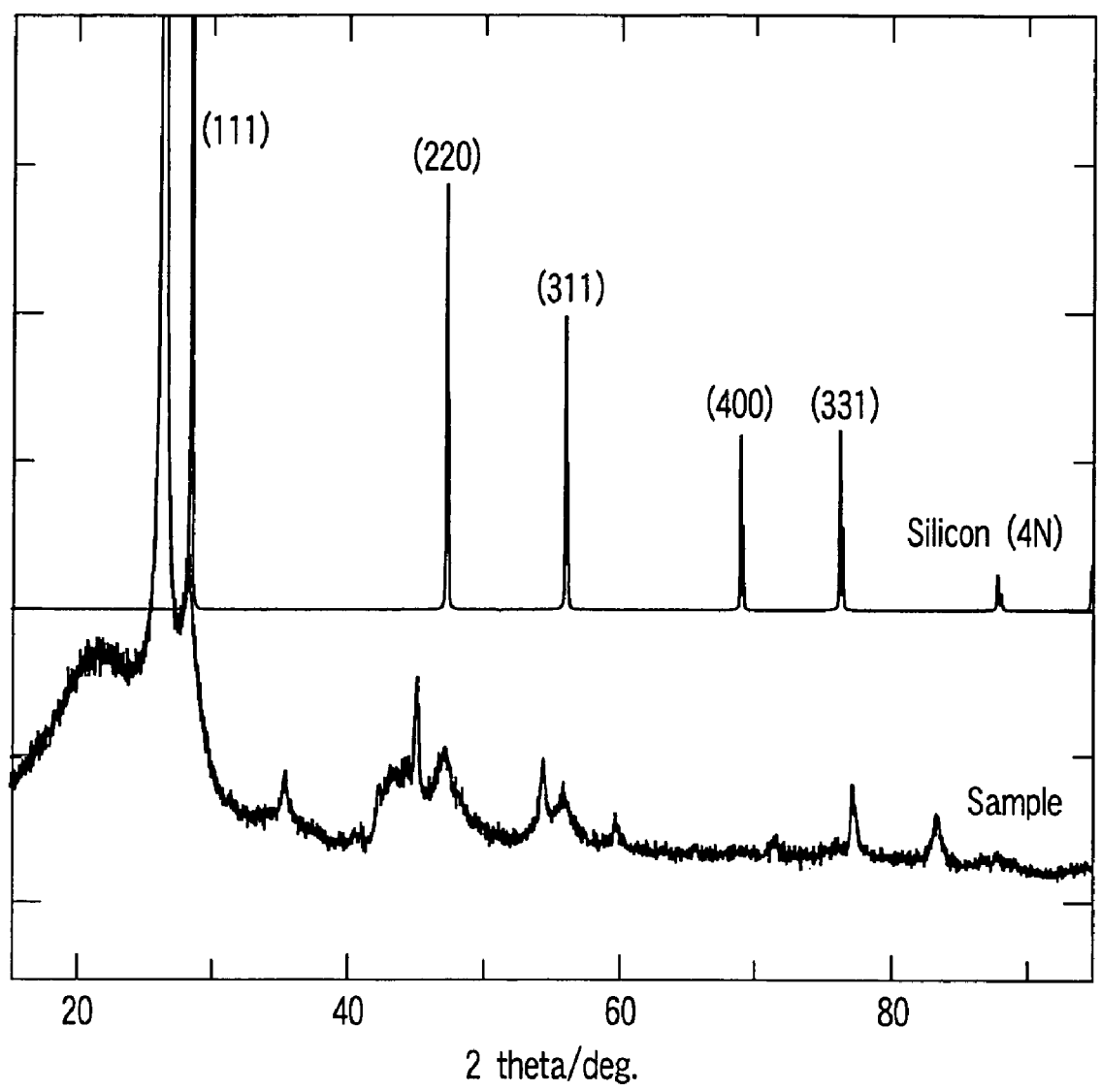
FIG. 3 is a characteristic diagram for comparing the powder X-ray diffraction pattern of the negative electrode active material and a powder X-ray diffraction pattern of silicon in Example 7.

FIG. 3 shows only the XRD pattern (XRD pattern of sample) of (iv) and the XRD pattern (XRD pattern of 4N silicon) of (v).

As known from (i) of FIG. 2, peak is not observed in the XRD pattern of material SiO, and it is known to be amorphous. As clear from comparison between pattern (iii) and pattern (v), when SiO is baked in an inert atmosphere, a broad Si peak is formed. On the other hand, as understood from XRD pattern (iv), the negative electrode active material of Example 7 is a Si—C composite material having complicated peaks, but basically the diagram shows a compounded peak of the peak derived from material graphite of (ii) and the peak derived from baked SiO of (iii). Hence, the peak appearing near 47° of 2θ in FIGS. 2 and 3 is the diffraction peak of silicon (220) plane.

Figure 4:
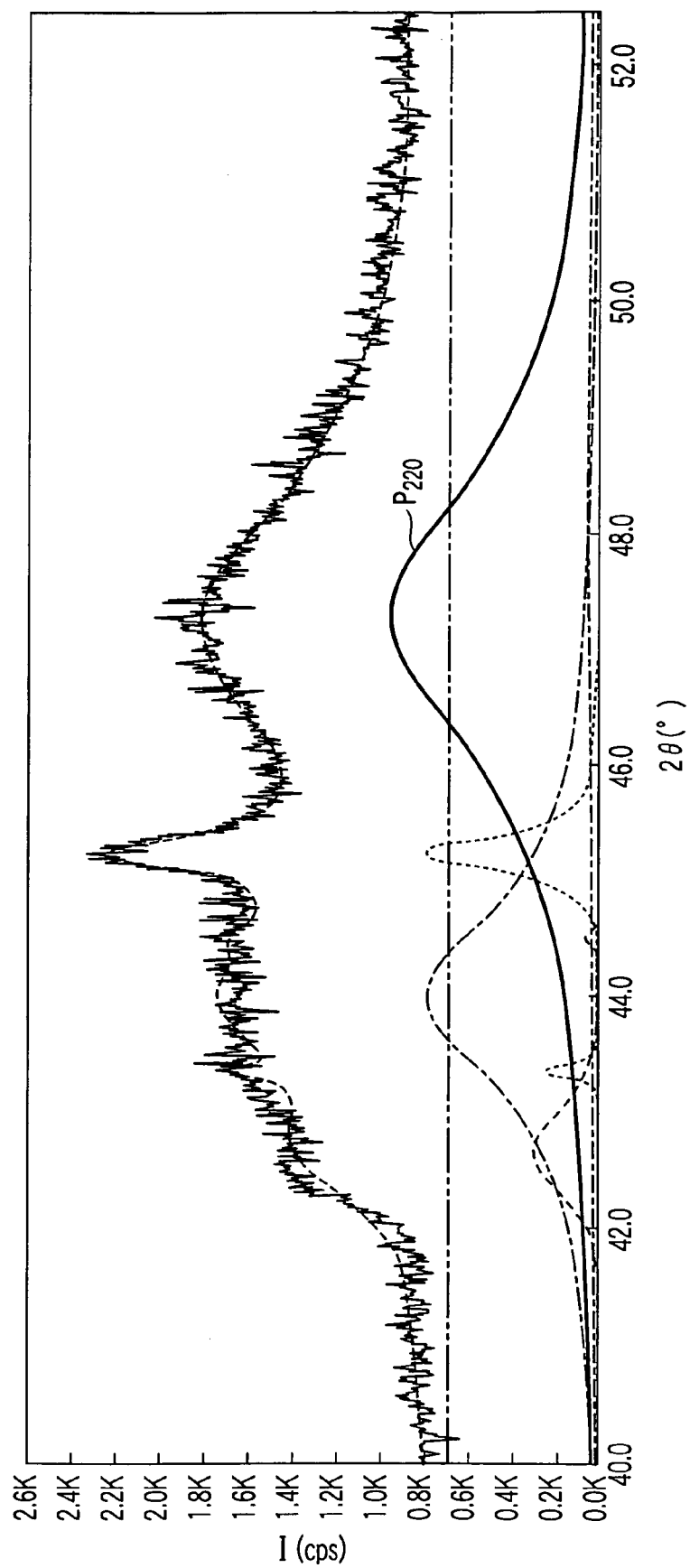
FIG. 4 is a characteristic diagram showing a result of peak separation of the powder X-ray diffraction pattern of the negative electrode active material in Example 7.

From the X-ray diffraction pattern, the half width of the peak (° (2θ)) of plane index (220) of Si appearing at spacing d of 1.92 Å (2θ being 47.2°) was measured. If the peak of Si (220) overlaps with the peak of other substances contained in the active material, the peak was isolated and the half width was measured. FIG. 4 shows an example of peak separation. As known from FIG. 4, plural peaks derived from the graphite structure of the graphite appearing at 2θ of 42 to 46° overlap with the peak ($P_{220}$) of the Si (220) plane at 2θ of near 47°. By peak separation calculation, each peak was isolated, and the half width of the (220) plane peak of Si was determined (FWHM=3.005°).

Further, from the results of the X-ray diffraction pattern, it was confirmed that the silicon oxide phase is contained in the negative electrode active materials of Examples 1 to 5.

(Transmission Electron Microscope (TEM) observation)

A TEM sample was prepared by suspending a small amount of powder in ethanol solution, and dropping the suspension on a collodion membrane. After drying the wet collodion sufficiently, light field image, dark field image and lattice image were observed at magnification of 100,000 to 500,000 times by FE-TEM (field emission transmission electron microscope; model HF-2000) at acceleration voltage of 200 kV. Further, to identify the growth phase, an electron beam diffraction pattern was photographed and the crystal structure of the growth phase was identified.

Figure 7:
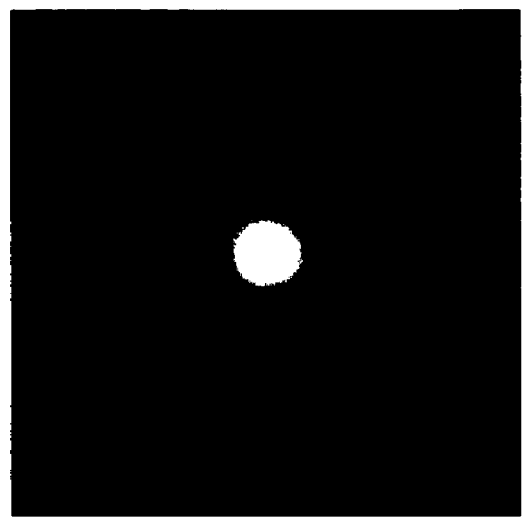
FIG. 7 is image data showing an electron beam diffraction pattern of the negative electrode active material in Example 7.
Figure 8:
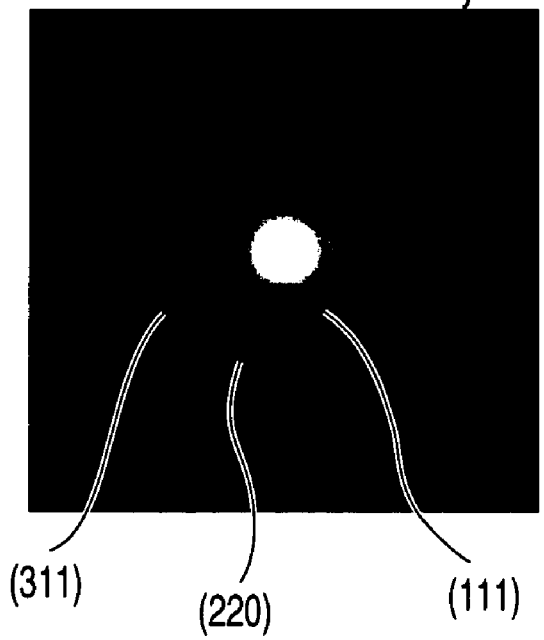
FIG. 8 shows the image data in FIG. 7 with a caption added thereto.
Figure 9:
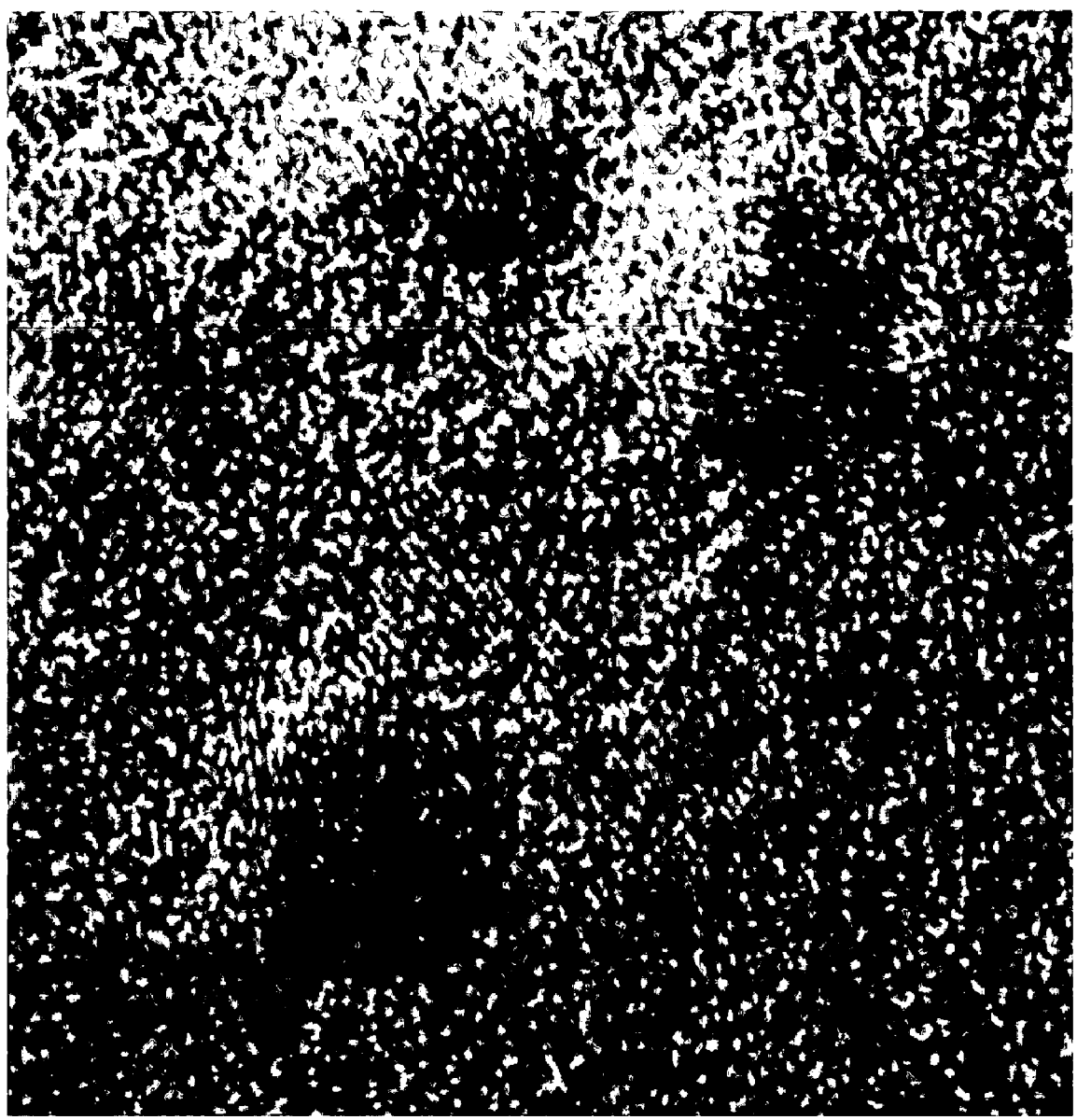
FIG. 9 is a transmission electron microscopic picture of a lattice image magnified by 4,800,000 times, of the negative electrode active material in Example 7.
Figure 10:
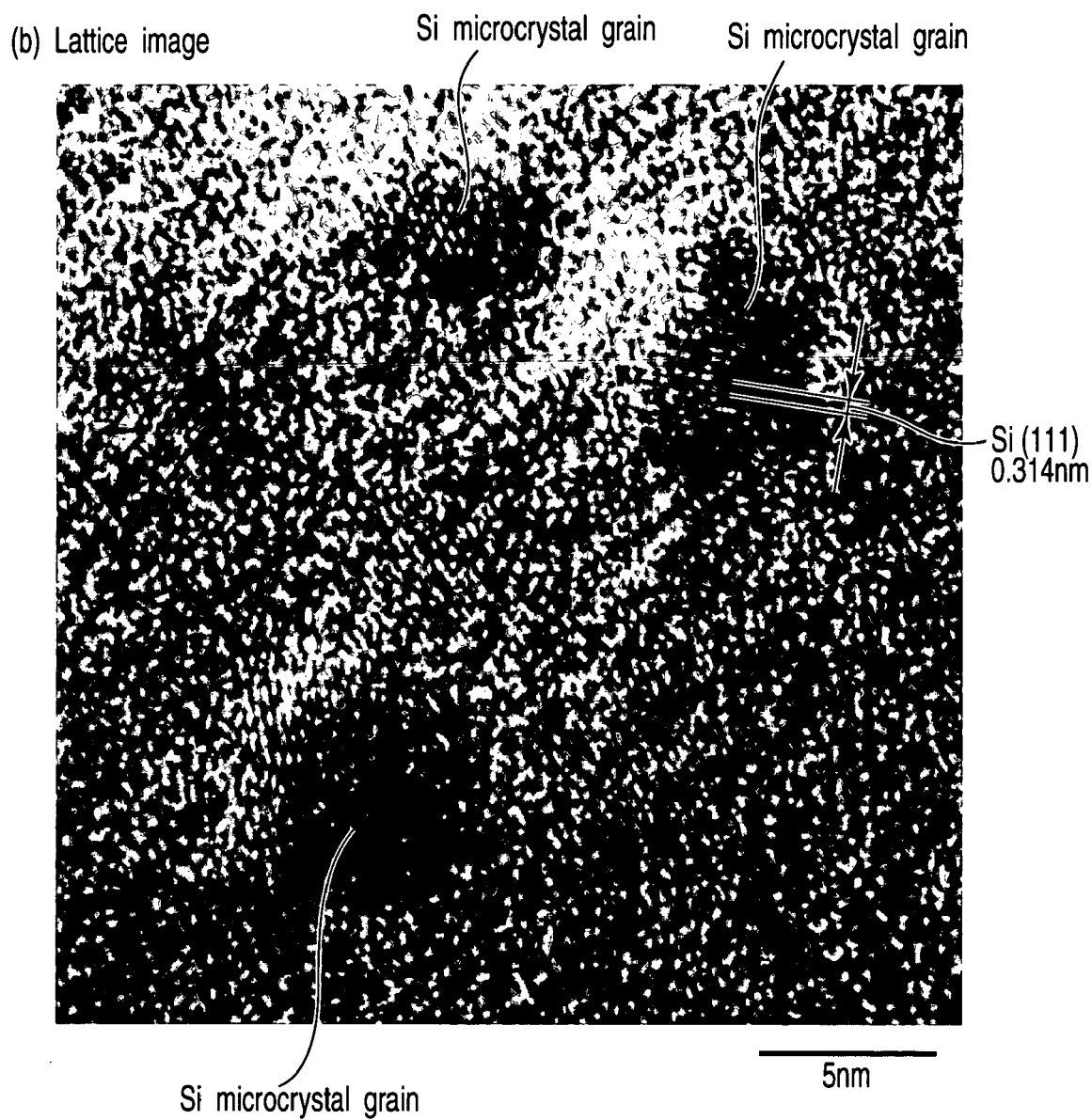
FIG. 10 shows the transmission electron microscopic picture in FIG. 9 with a caption added thereto.

FIG. 5 shows a transmission electron microscopic picture magnified by 800,000 times of the negative electrode active material in Example 7. FIG. 6 shows the transmission electron microscopic picture in FIG. 5 with a caption added thereto. FIG. 7 is image data showing electron beam diffraction pattern of the negative electrode active material in Example 7. FIG. 8 shows the image data in FIG. 7 with a caption added thereto. FIG. 9 is a transmission electron microscopic picture of a lattice image magnified by 4,800,000 times of the negative electrode active material in Example 7. FIG. 10 shows the transmission electron microscopic picture in FIG. 9 with a caption added thereto.

As can be seen from FIGS. 5 and 6, the negative electrode active material of Example 7 is a composite material having multiple fine grains existing in carbonaceous particles. On the other hand, from the Debye-Scherrer rings of electron beam diffraction patterns in FIGS. 7 and 8, the patterns derived from (111) plane, (220) plane and (311) plane of Si were confirmed, and it is found that the fine grains were identified to be microcrystals of Si. Also from the lattice image in FIGS. 9 and 10, the Si phase was confirmed to be microcrystals, and the spacing d of (111) plane of Si was found to be 0.314 nm. It has been also confirmed from FIG. 6 that most Si phase is surrounded with silicon oxide phase such as $SiO_2$ phase, and that the silicon oxide phase is surrounded with the carbonaceous material phase.

The average size of the Si phase was determined in the method as explained below.

Figure 11:
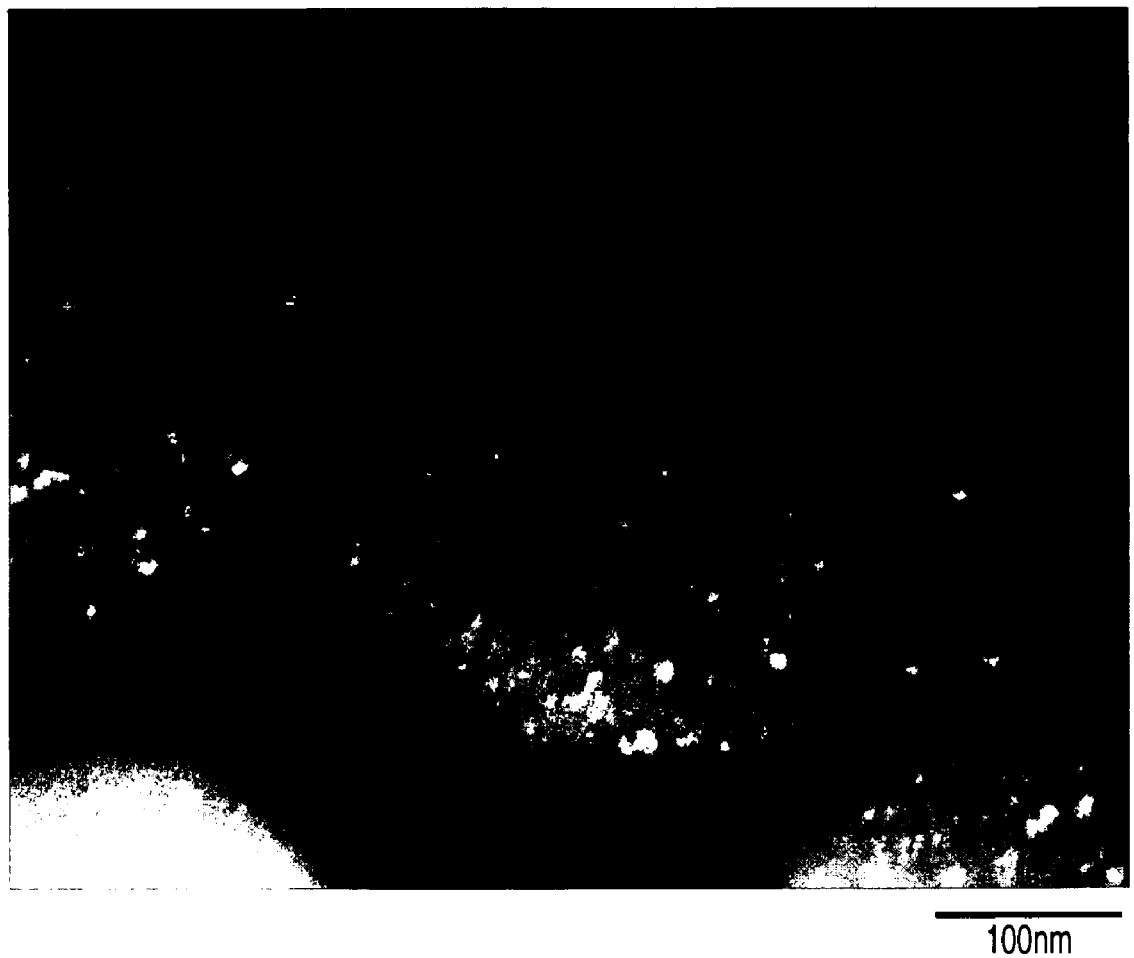
FIG. 11 is a transmission electron microscopic picture magnified by 220,000 times of the negative electrode active material in Example 7.

That is, the size was measured in all Si microcrystals observed in TEM photograph (the picture size is 600 nm×500 nm) taking the dark field image magnified by 400,000 times, and the average size was calculated. Of the TEM photographs used in measurement of the average size, the image of the negative electrode active material of Example 7 is shown in FIG. 11 as an example. FIG. 11 is a copy of the TEM photograph actually used to determine the average size. Note that the copy is reduced in size for presentation on a sheet of limited size and shows Si microcrystals magnified 220,000 times.

The molar ratio ($X_1/X_2$) of the negative electrode active material in Example 1 was 1.03, and the molar ratio ($X_1/X_3$) was 0.86.

(Charging and Discharging Test)

5 wt. % of acetylene black and 3 wt. % of polytetrafluoroethylene were added to the negative electrode active material to be formed in a sheet, and the sheet was compressed to a stainless steel mesh, and then dried in vacuum at 150° C. to obtain a test electrode. The counter electrode and reference electrode were made of metal Li. A nonaqueous electrolysis solution was obtained by dissolving 1 M of $LiPF_6$ in a nonaqueous solvent in which ethylene carbonate (EC) and methyl ethyl carbonate (MEC) are mixed at a ratio by volume of 1:2. Using the obtained test negative electrode, counter electrode, reference electrode and nonaqueous electrolysis solution, a test cell was assembled in an argon atmosphere, and a charging and discharging test was conducted.

The condition of the charging and discharging test is as follows. The battery was charged at a current density of 1 mA/cm² up to a potential difference of 0.01 V between the reference electrode and the test electrode, and was further charged at a constant voltage of 0.01 V for 8 hours. It was discharged at a current density of 1 mA/cm² until becoming 3 V.

Table 2 shows the discharge capacity of the first cycle in the charging and discharging test, the discharge capacity maintenance rate after 50 cycles (supposing the discharge capacity of the first cycle to be 100%), the half width of the peak of Si (220) plane obtained from the powder X-ray diffraction, and the average size of the Si phase.

TABLE 2

| | Discharge capacity (mAh/g) | Capacity maintenance rate after 50 cycles (%) | Si (220) peak half width (°) | Average size of Si phase (nm) |
|---|---|---|---|---|
| Example 1 | 674 | 91 | 8.0 | 4.02 |
| Example 2 | 688 | 95 | 2.6 | 8.40 |
| Example 3 | 675 | 83 | 2.0 | 9.67 |
| Example 4 | 690 | 88 | 2.1 | 14.2 |
| Example 5 | 640 | 82 | 2.0 | 16.5 |
| Comparative example 1 | 470 | 79 | No peak | Si phase was not observed |
| Comparative example 2 | 320 | 80 | 1.2 | 16.8 |
| Comparative example 3 | 870 | 23 | 0.2 | 500 |

As known from the results shown in Table 2, the secondary battery having the negative electrode active material of Examples 1 to 5 has a large discharge capacity and a favorable cycle characteristic. That is, in Comparative example 1, since the baking temperature was 700° C., SiO was not separated into Si and $SiO_2$, and thereby both the capacity and the cycle characteristic were lowered. In Comparative example 2, since the baking temperature was 1400° C., the half width of the peak of Si (220) plane was smaller and the cycle characteristic was lowered, and also the produced Si reacted with C to be SiC incapable of absorbing Li, so that the capacity dropped significantly. In Comparative example 3, since the crystal size of the Si phase was large, the half width was small, and $SiO_2$ was absent, so that the cycle characteristic dropped significantly.

EXAMPLE 6

Using a ball mill (model P-5 of Fritsch), the negative electrode active material was synthesized in the material composition, ball mill operating condition, and baking condition as shown in Table 3.

In the case of the ball mill, a stainless steel container of volume of 250 ml and a ball of 10 mm in diameter were used. The sample was charged by 20 g. The material contained 8 g of SiO powder having the average particle size of 45 µm, and 12 g of graphite powder having the average particle size of 6 µm as the carbon material. The rotating speed (rpm) of the ball mill and the treatment time are shown in Table 3.

The composite material obtained by the ball mill was baked in Ar gas at the baking temperature and for the baking time shown in Table 3, cooled to room temperature, and then ground by a grinder, and a negative electrode active material was obtained by sifting by 30 µm in particle size.

The molar ratio ($X_1/X_2$) of the negative electrode active material in Example 6 was 0.68, and the molar ratio ($X_1/X_3$) was 1.12.

EXAMPLES 7 to 17

Negative electrode active materials were obtained in the same procedure as in Example 6, except that the average particle size and charging amount of SiO, type and charging amount of the organic material, rotating speed of the ball mill, treating time, baking temperature and baking time were set as shown in Table 3. As the carbon material precursor in Table 3, ground pitch of 1 mm in particle size was used.

COMPARATIVE EXAMPLE 4

A negative electrode active material was obtained in the same procedure as in Example 6, except that Si powder having the average particle size of 1 μm was used instead of SiO powder.

The negative electrode active materials of Examples 6 to 17 and Comparative example 4 were tested by powder X-ray diffraction and transmission electron microscope observation in the same conditions as in Example 1, and the negative electrode active materials of Examples 6 to 17 were confirmed to be composite materials having multiple Si microcrystal grains existing in carbonaceous particles, and it was also known that silicon oxide phases are contained in the carbonaceous particles. Table 4 shows the half width of the peak of Si (220) plane, average size of the Si microcrystal phase, discharge capacity of first cycle, and capacity maintenance rate after 50 cycles. The charging and discharging characteristic was evaluated in the same condition as explained in Example 1.

TABLE 3

|  | Material | | Ball mill condition | | Baking condition | |
| --- | --- | --- | --- | --- | --- | --- |
|  | SiO | Organic material | Rotating speed (rpm) | Treating time (hrs) | Baking temperature | Baking time |
| Example 6 | 45 μm 8 g | Graphite 12 g | 80 | 18 | 1000° C. | 3 h |
| Example 7 | 45 μm 8 g | Graphite 12 g | 100 | 16 | 1000° C. | 3 h |
| Example 8 | 45 μm 8 g | Graphite 12 g | 150 | 16 | 1000° C. | 3 h |
| Example 9 | 45 μm 8 g | Graphite 12 g | 200 | 13 | 1000° C. | 3 h |
| Example 10 | 45 μm 12 g | Graphite 8 g | 105 | 16 | 1000° C. | 3 h |
| Example 11 | 45 μm 10 g | Graphite 10 g | 105 | 16 | 1000° C. | 3 h |
| Example 12 | 45 μm 6 g | Graphite 14 g | 105 | 16 | 1000° C. | 3 h |
| Example 13 | 45 μm 8 g | Graphite 6 g + pitch 6 g | 125 | 13 | 1000° C. | 3 h |
| Example 14 | 45 μm 8 g | Graphite 2 g + pitch 10 g | 125 | 14 | 1000° C. | 3 h |
| Example 15 | 45 μm 8 g | Graphite 8 g + pitch 4 g | 125 | 16 | 1000° C. | 3 h |
| Example 16 | 5 μm 8 g | Graphite 12 g | 105 | 16 | 1000° C. | 3 h |
| Example 17 | 5 μm 8 g | Graphite 6 g + pitch 6 g | 105 | 16 | 1000° C. | 3 h |
| Comparative example 4 | Si; 1 μm; 8 g | Graphite 12 g | 80 | 18 | 1000° C. | 3 h |

TABLE 4

|  | Si (220) peak half width (°) | Average size of Si phase (nm) | Discharge capacity (mAh/g) | Capacity maintenance rate after 50 cycles (%) |
| --- | --- | --- | --- | --- |
| Example 6 | 3.04 | 9.21 | 920 | 82 |
| Example 7 | 3.87 | 9.49 | 941 | 92 |
| Example 8 | 3.49 | 7.33 | 902 | 94 |
| Example 9 | 6.02 | 6.89 | 751 | 91 |
| Example 10 | 2.78 | 8.60 | 1121 | 87 |
| Example 11 | 3.02 | 9.19 | 1005 | 85 |
| Example 12 | 3.32 | 10.03 | 866 | 91 |
| Example 13 | 3.46 | 8.76 | 911 | 92 |
| Example 14 | 3.33 | 11.27 | 896 | 91 |
| Example 15 | 3.68 | 8.54 | 915 | 88 |
| Example 16 | 4.33 | 7.55 | 898 | 92 |
| Example 17 | 4.53 | 8.30 | 899 | 91 |

TABLE 4-continued

|  | Si (220) peak half width (°) | Average size of Si phase (nm) | Discharge capacity (mAh/g) | Capacity maintenance rate after 50 cycles (%) |
| --- | --- | --- | --- | --- |
| Comparative example 4 | 0.164 | 1 μm | 1055 | 15 |

As clear from Tables 3 and 4, it is understood that the secondary batteries having the negative electrode active materials of Examples 6 to 17 of which half width of the peak of Si (220) plane is 1.5° to 8°, and of which average size of the Si phase is less than 100 nm are excellent in both the discharge capacity and capacity maintenance rate after 50 cycles.

On the contrary, in the secondary battery having the negative electrode active material of Comparative example 4 of which half width of the peak of Si (220) plane is smaller than 1.5°, and of which average size of the Si phase is not less than 100 nm, the capacity maintenance rate after 50 cycles was smaller as compared with Examples 6 to 17.

Negative electrode active materials of Examples 6 to 17 in Table 4 are obtained by the method that includes compounding graphite powder and Si powder by ball mill treatment and then baking. Since the raw material of graphite powder has been already graphitized, it is hardly influenced by heat effects of baking or the like, so that the charging and discharging characteristic of the negative electrode active material of Examples 6 to 17 mainly depends on the state of the Si phase. Therefore, by comparing Examples 6 to 17, it is understood that Examples 6 to 8, and 10 to 17 of which half-width of the peak of Si (220) plane is in a range of 2 to 6° have a higher discharge capacity as compared with Example 9 of which half-width is greater than 6°.

On the other hand, the negative electrode active materials of Examples 1 to 5 in Table 2 are obtained by the method that includes baking a mixture of a carbon precursor and SiO. As known from Table 2, when a carbon precursor is used as the raw material, secondary batteries excellent in both the discharge capacity and charging and discharging cycle life are obtained by baking at temperature lower than 1100° C. as in Examples 1 and 2. When the carbon precursor is used as the material, the state of the Si phase is likely to change depending on the baking condition, and the state of the carbonaceous phase existing around the Si phase is also likely to change. When the baking temperature is 1100° C. or more, the production reaction of SiC takes place. As a result, when the carbon precursor is used as the material, by keeping the baking temperature at lower than 1100° C., secondary batteries excellent in both the discharge capacity and charging and discharging cycle life are obtained.

As described herein, the invention can provide a negative electrode active material capable of obtaining a nonaqueous electrolyte secondary battery with large capacity and long cycle life, and a nonaqueous electrolyte secondary battery comprising such negative electrode active material.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery comprising:
   a positive electrode;
   a negative electrode containing a negative electrode active material including carbonaceous particles comprising graphite, said carbonaceous particles each including silicon oxide phases dispersed therein, said silicon oxide phases each including an Si phase dispersed therein; and
   a nonaqueous electrolyte;
   wherein the negative electrode active material is 1.5° or more and 8° or less in a half width of a diffraction peak derived from (220) plane of silicon in powder X-ray diffraction, and
   an average size of the Si phase is less than 100 nm.

2. The nonaqueous electrolyte secondary battery according to claim 1, wherein the average size of the Si phase is 1 nm or more and less than 100 nm.

3. The nonaqueous electrolyte secondary battery according to claim 1, wherein the average size of the Si phase is 2 nm or more and 50 nm or less.

4. The nonaqueous electrolyte secondary battery according to claim 1, wherein the half width is 2° or more and 6° or less.

5. The nonaqueous electrolyte secondary battery according to claim 1, wherein the carbonaceous particles satisfy the following formula (1):

$$0.2 \leq (X_1/X_2) \leq 2 \tag{1}$$

where the $X_1$ is a molar number of a silicon atom in the carbonaceous particles, and the $X_2$ is a molar number of a carbon atom in the carbonaceous particles.

6. The nonaqueous electrolyte secondary battery according to claim 1, wherein an average particle size of the carbonaceous particles is 5 μm or more and 100 μm or less.

7. The nonaqueous electrolyte secondary battery according to claim 1, wherein the silicon oxide phase contains at least one compound of $SiO_2$ and SiO.

8. The nonaqueous electrolyte secondary battery according to claim 1, wherein the carbonaceous particles satisfy the following formula (2):

$$0.6 \leq (X_1/X_3) \leq 1.5 \tag{2}$$

where the $X_1$ is a molar number of a silicon atom of the Si phase, and the $X_3$ is a molar number of a silicon oxide molecule of the silicon oxide phase.

9. A negative electrode active material for nonaqueous electrolyte secondary battery, including carbonaceous particles comprising graphite, said carbonaceous particles each including silicon oxide phases dispersed therein, said silicon oxide phases each including an Si phase dispersed therein,
   wherein a half width of a diffraction peak of (220) plane in powder X-ray diffraction is 1.5° or more and 8° or less, and
   an average size of the Si phase is less than 100 nm.

10. The negative electrode active material for nonaqueous electrolyte secondary battery, according to claim 9, wherein the average size of the Si phase is 1 nm or more and less than 100 nm.

11. The negative electrode active material for nonaqueous electrolyte secondary battery, according to claim 9, wherein the half width is 2° or more and 6° or less.

12. The negative electrode active material for nonaqueous electrolyte secondary battery, according to claim 9, wherein an average particle size of the carbonaceous particles is 5 μm or more and 100 μm or less.

13. The negative electrode active material for nonaqueous electrolyte secondary battery, according to claim 9, wherein the silicon oxide phase contains at least one compound of $SiO_2$ and SiO.

* * * * *